US012754033B2

(12) United States Patent
Telpaz et al.

(10) Patent No.: US 12,754,033 B2
(45) Date of Patent: Oct. 6, 2026

(54) SYSTEM AND METHOD FOR PREDICTING A DESTINATION FOR A VEHICLE

(71) Applicant: GM GLOBAL TECHNOLOGY OPERATIONS LLC, Detroit, MI (US)

(72) Inventors: Ariel Telpaz, Givat Haim Meuhad (IL); Ron M. Hecht, Raanana (IL); Gershon Celniker, Netanya (IL); Nadav Baron, Hod Hasharon (IL); Giora Saar, Beit Haemek (IL); Refael Blanca, West Bloomfield Township, MI (US); Miri Rozov, Rosh ha Ain (IL)

(73) Assignee: GM Global Technology Operations LLC, Detroit, MI (US)

( * ) Notice: Subject to any disclaimer, the term of this patent is extended or adjusted under 35 U.S.C. 154(b) by 173 days.

(21) Appl. No.: 18/736,881

(22) Filed: Jun. 7, 2024

(65) Prior Publication Data

US 2025/0377213 A1 Dec. 11, 2025

(51) Int. Cl.
*G01C 21/36* (2006.01)
*G06N 5/01* (2023.01)

(52) U.S. Cl.
CPC ........... *G01C 21/3617* (2013.01); *G06N 5/01* (2023.01)

(58) Field of Classification Search
CPC ... G01C 21/3617; G01C 21/3484; G06N 5/01
See application file for complete search history.

(56) References Cited

U.S. PATENT DOCUMENTS

2005/0283311 A1* 12/2005 Ohler ................. G01C 21/3691 340/995.19
2011/0238289 A1* 9/2011 Lehmann ........... G01C 21/3617 701/533
2011/0282571 A1* 11/2011 Krumm .................. G01C 21/34 701/532

(Continued)

FOREIGN PATENT DOCUMENTS

CN 111324824 A * 6/2020 ......... G06Q 30/0635
EP 3252704 B1 12/2017
EP 3270334 A1 * 1/2018 ............. G06Q 10/02

OTHER PUBLICATIONS

Machine Translation: CN-111324824-A (Year: 2020).*

*Primary Examiner* — Anne Marie Antonucci
*Assistant Examiner* — Connor L Knight
(74) *Attorney, Agent, or Firm* — Quinn IP Law

(57) ABSTRACT

A method includes receiving a trip history for an operator of the vehicle with the trip history including trip information regarding previous trips by the operator of the vehicle. A data cluster corresponding to each destination in the trip history is generated by extracting input features from trip information for each trip. The input features characterize a relationship between the operator of the vehicle and the previous trips. A training dataset is generated based on collecting the data cluster corresponding to each of the destinations in the trip history. The training dataset is utilized to develop a gradient boosted trees model. At least one destination for the operator of the vehicle is predicted with the gradient boosted trees model utilizing at least one (Continued)

of an origin location of the operator of the vehicle, a time, or a day as input conditions for the gradient boosted trees model.

20 Claims, 2 Drawing Sheets

(56) References Cited

U.S. PATENT DOCUMENTS

| | | | | |
|---|---|---|---|---|
| 2013/0166096 | A1* | 6/2013 | Jotanovic | G01C 21/3617 701/1 |
| 2015/0134244 | A1* | 5/2015 | Hershey | G01C 21/3617 701/489 |
| 2017/0254660 | A1 | 9/2017 | Panahandeh et al. | |
| 2017/0364821 | A1 | 12/2017 | Mathur et al. | |
| 2018/0276571 | A1* | 9/2018 | Poddar | G06Q 10/02 |
| 2019/0018426 | A1 | 1/2019 | Yao et al. | |
| 2019/0094858 | A1* | 3/2019 | Radosavljevic | G05D 1/0088 |
| 2019/0145779 | A1* | 5/2019 | Li | G01C 21/20 701/423 |
| 2019/0186939 | A1* | 6/2019 | Cox | G06N 20/00 |
| 2024/0247939 | A1* | 7/2024 | Holder | G06N 20/00 |
| 2025/0190817 | A1* | 6/2025 | Wang | G06N 5/01 |

* cited by examiner

200

| DC | IF1 | IF2 | IF3 | IF4 | IF5 | • • • | IFX | LAB |
|---|---|---|---|---|---|---|---|---|
| DC0 | # | # | # | # | # | # | # | 1 |
| DC1 | # | # | # | # | # | # | # | 0 |
| DC2 | # | # | # | # | # | # | # | 0 |
| DC3 | # | # | # | # | # | # | # | 0 |
| • • • | # | # | # | # | # | # | # | 0 |
| DCX | # | # | # | # | # | # | # | 0 |

SYSTEM AND METHOD FOR PREDICTING A DESTINATION FOR A VEHICLE

INTRODUCTION

The subject disclosure relates to vehicle navigation and, in particular, to a system and method for predicting a destination for a vehicle.

An operator of a vehicle may be responsible for both maneuvering a vehicle along a roadway in addition to choosing which roadways the vehicle should operate along in order to reach a desired destination. To aid the driver in choosing which roadways to operate the vehicle, the operator of the vehicle may have access to a navigation system that utilizes a global positioning system to determine which route best suits the needs of the operator. The navigation system can be integrated into the vehicle, or it can be separate from the vehicle, such as in the case of a mobile cellular device.

DESCRIPTION OF THE DRAWINGS

Some embodiments of the present disclosure are now described, by way of example only, and with reference to the accompanying drawings. The same reference number represents the same element or the same type of element on all drawings.

SUMMARY

Figure 1:
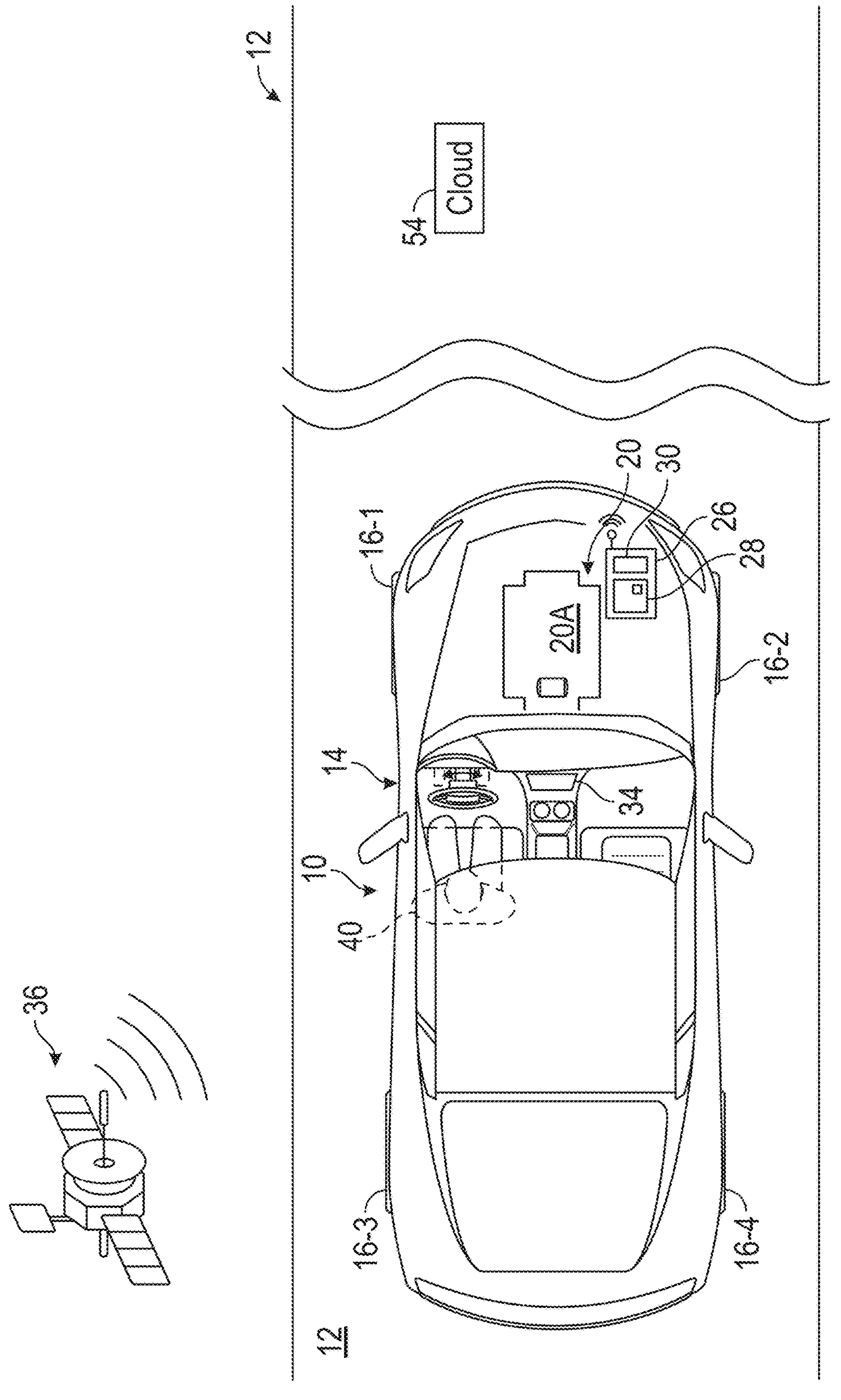
FIG. 1 illustrates an example vehicle having a human interface, in accordance with an exemplary embodiment.

Disclosed herein is a method of operating a vehicle. The method includes receiving a trip history for an operator of the vehicle with the trip history including trip information regarding previous trips by the operator of the vehicle. A data cluster corresponding to each destination in the trip history is generated by extracting input features from trip information for each trip in the trip history. The input features characterize a relationship between the operator of the vehicle and the previous trips. A training dataset is generated based on collecting the data cluster corresponding to each of the destinations in the trip history. The training dataset is utilized to develop a gradient boosted trees model. At least one destination for the operator of the vehicle is predicted with the gradient boosted trees model utilizing at least one of an origin location of the operator of the vehicle, a time of day, or a day of the week as input conditions for the gradient boosted trees model.

In one aspect of the disclosure the trip history includes at least one of a starting location, an ending location, and a start time for each of the previous trips.

In one aspect of the disclosure at least one of the input features characterizes a current location for a newly initiated trip with respect to a destination for each of the previous trips.

In one aspect of the disclosure the input features for each data cluster include at least one of a distance from the origin location to a corresponding destination for each data cluster or an elapsed time since the operator of the vehicle visited the corresponding destination for each data cluster.

In one aspect of the disclosure the input features for each data cluster includes at least one of a number of visits to each destination corresponding to the data cluster or a number of visits to each destination corresponding to the data cluster with a starting location matching with the origin location.

In one aspect of the disclosure the input features for each data cluster includes a number of visits to each destination corresponding to the data cluster where a current location matches with the origin location and a current day of the week matches a day of the week of a corresponding one of the previous trips.

In one aspect of the disclosure the input features for each data cluster includes a number of visits to each destination corresponding to the data cluster where a current part of day matches part of day of a corresponding one of the previous trips.

In one aspect of the disclosure the input features for each data cluster includes a number of visits to each destination corresponding to the data cluster where a current day of the week matches at least one of a weekday type for the previous trips or a workday type for the previous trips.

In one aspect of the disclosure the input features for each data cluster includes a number of visits to each destination corresponding to the data cluster with a starting location matching with a current location.

In one aspect of the disclosure the method includes updating the training dataset with a label indicating if a destination in the trip history was visited at a conclusion of a newly initiated trip.

In one aspect of the disclosure the method includes applying hyperparameter tuning to the gradient boosted trees model.

In one aspect of the disclosure the hyperparameter tuning includes applying at least one of class weights to the input features, Laplace smoothing, or exponential decay.

In one aspect of the disclosure the at least one destination includes two possible destinations.

In one aspect of the disclosure the method includes displaying the at least one destination on a display in the vehicle along with a confidence level in the at least one destination.

Disclosed herein is a non-transitory computer-readable storage medium embodying programmed instructions which, when executed by a processor, are operable for performing a method. The method includes receiving a trip history for an operator of the vehicle with the trip history including trip information regarding previous trips by the operator of the vehicle. A data cluster corresponding to each destination in the trip history is generated by extracting input features from trip information for each trip in the trip history. The input features characterize a relationship between the operator of the vehicle and the previous trips. A training dataset is generated based on collecting the data cluster corresponding to each of the destinations in the trip history. The training dataset is utilized to develop a gradient boosted trees model. At least one destination for the operator of the vehicle is predicted with the gradient boosted trees model utilizing at least one of an origin location of the operator of the vehicle, a time of day, or a day of the week as input conditions for the gradient boosted trees model.

Disclosed herein is a vehicle. The vehicle includes a vehicle body supported by road wheels, a vehicle navigation system configured to provide directions to a destination, and a controller in communication with the navigation system. The controller is configured to receive a trip history for an operator of the vehicle. The trip history includes trip information regarding previous trips by the operator of the vehicle. The controller is also configured to generate a data cluster corresponding to each destination in the trip history by extracting input features from trip information for each trip in the trip history. The input features characterize a relationship between the operator of the vehicle and the previous trips. The controller is also configured to generate a training dataset based on collecting the data cluster corresponding to each of the destinations in the trip history and utilize the training dataset to develop a gradient boosted trees model to predict at least one destination for the operator of the vehicle with the gradient boosted trees model by utilizing at least one of an origin location of the operator of the vehicle, a time of day, or a day of the week as input conditions for the gradient boosted trees model.

DETAILED DESCRIPTION

Those having ordinary skill in the art will recognize that terms such as "above," "below", "upward", "downward", "top", "bottom", "left", "right", etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may include a number of hardware, software, and/or firmware components configured to perform the specified functions.

Referring to the FIGS., wherein like numerals indicate like parts referring to the drawings, wherein like reference numbers refer to like components, FIG. 1 shows a schematic view of a motor vehicle 10 positioned relative to a road surface, such as a vehicle lane 12. As shown in FIG. 1, the motor vehicle 10 includes a vehicle body 14, a first axle having a first set of road wheels 16-1, 16-2, and a second axle having a second set of road wheels 16-3, 16-4 (such as individual left-side and right-side wheels on each axle). Each of the road wheels 16-1, 16-2, 16-3, 16-4 employs tires configured to provide fictional contact with the vehicle lane 12. Although two axles, with the respective road wheels 16-1, 16-2, 16-3, 16-4, are specifically shown, nothing precludes the motor vehicle 10 from having additional axles.

As shown in FIG. 1, a vehicle suspension system operatively connects the vehicle body 14 to the respective sets of road wheels 16-1, 16-2, 16-3, 16-4 for maintaining contact between the wheels and the vehicle lane 12, and for maintaining handling of the motor vehicle 10. The motor vehicle 10 additionally includes a drivetrain 20 having a power-source or multiple power-sources 20A, which may be an internal combustion engine (ICE), an electric motor, or a combination of such devices, configured to transmit a drive torque to the road wheels 16-1, 16-2 and/or the road wheels 16-3, 16-4. The motor vehicle 10 also employs vehicle operating or control systems, including devices such as one or more steering actuators (for example, an electrical power steering unit) configured to steer the road wheels 16-1, 16-2, a steering angle, an accelerator device for controlling power output of the power-source(s) 20A, a braking switch or device for retarding rotation of the road wheels 16-1 and 16-2 (such as via individual friction brakes located at respective road wheels), etc.

An electronic controller 26 is disposed in the motor vehicle 10 and may alternatively be referred to as a control module, a control unit, a controller, a vehicle controller, a computer, etc. The electronic controller 26 may include a computer and/or processor 28, and include software, hardware, memory, algorithms, connections, etc., for managing and controlling the operation of the motor vehicle 10. As such, a method, described below and generally represented in FIG. 2, may be embodied as a program or algorithm at least partially operable on the electronic controller 26.

The electronic controller 26 may be embodied as one or multiple digital computers or host machines each having one or more processors 28, read only memory (ROM), random access memory (RAM), electrically-programmable read only memory (EPROM), optical drives, magnetic drives, etc., a high-speed clock, analog-to-digital (A/D) circuitry, digital-to-analog (D/A) circuitry, and input/output (I/O) circuitry, I/O devices, and communication interfaces, as well as signal conditioning and buffer electronics. The computer-readable memory may include non-transitory/tangible medium which participates in providing data or computer-readable instructions. Memory may be non-volatile or volatile. Non-volatile media may include, for example, optical or magnetic disks and other persistent memory. Example volatile media may include dynamic random-access memory (DRAM), which may constitute a main memory. Other examples of embodiments for memory include a flexible disk, hard disk, magnetic tape or other magnetic medium, a CD-ROM, DVD, and/or other optical medium, as well as other possible memory devices such as flash memory. The electronic controller 26 includes a tangible, non-transitory memory 30 on which computer-executable instructions, including one or more algorithms, are recorded for regulating operation of the motor vehicle 10.

The motor vehicle 10 also includes a vehicle navigation system 34, which may be part of integrated vehicle controls, or an add-on apparatus used to find travel direction in the vehicle. The vehicle navigation system 34 is also operatively connected to a global positioning system (GPS) 36 using an earth orbiting satellite. The electronic controller 26 is in communication with the GPS 36 via the vehicle navigation system 34. The vehicle navigation system 34 uses a satellite navigation device (not shown) to receive its position data from the GPS 36, which is then correlated to the vehicle's position relative to the surrounding geographical area. Based on such information, when directions to a specific waypoint are needed, routing to such a destination may be mapped and calculated. On-the-fly terrain and/or traffic information may be used to adjust the route. The current position of the motor vehicle 10 may be calculated via dead reckoning—by using a previously determined position and advancing that position based upon given or estimated speeds over elapsed time and course by way of discrete control points.

Figures 2, 3:
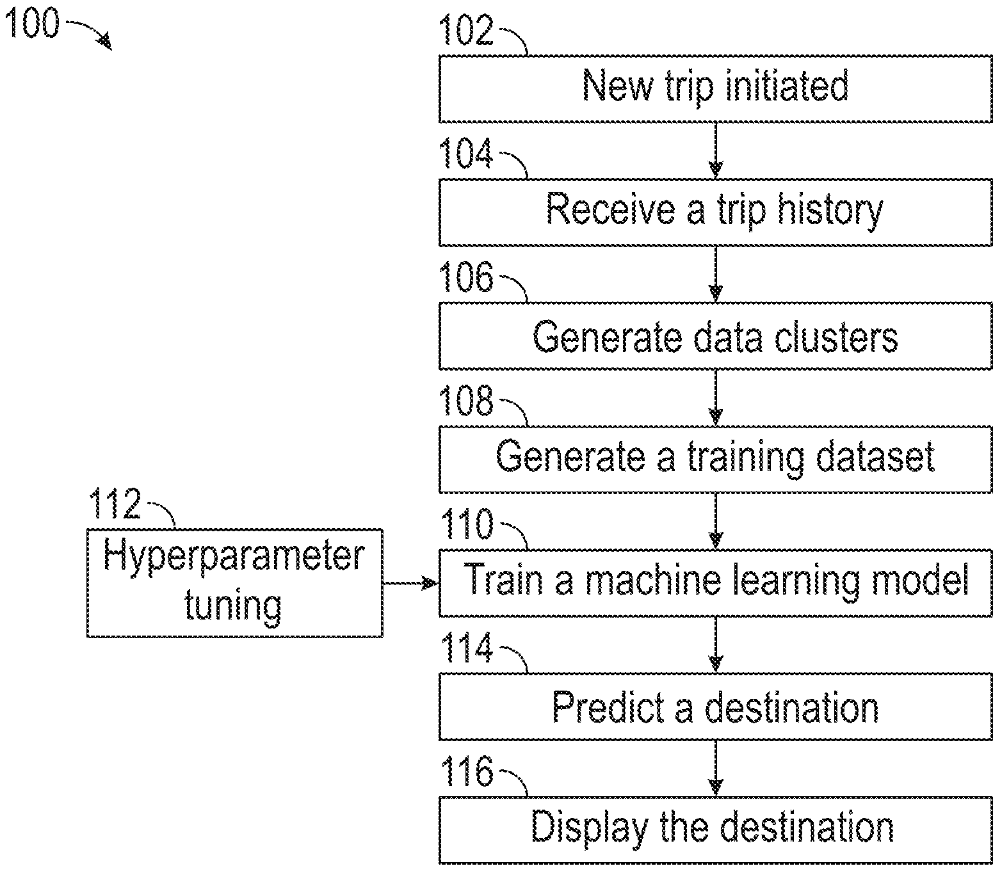
FIG. 2 illustrates a flowchart for an example method of predicting a destination for a vehicle.
FIG. 3 illustrates an example training dataset having multiple data clusters.

FIG. 2 illustrates a flowchart for an example method 100 of predicting one or more destinations for the motor vehicle 10. The ability to predict destinations for the motor vehicle 10 allows the operator to simply select a destination, such as through the vehicle navigation system 34, instead of manually entering an address for the destination.

The method 100 begins at block 102 with an operator of the motor vehicle 10 initiating a new trip. In one example, the new trip may be initiated by the operator placing the motor vehicle 10 in an operational mode, such as by placing an ignition for the motor vehicle 10 into an "on" position. Once the new trip for the motor vehicle 10 has been initiated, the method 100 proceeds to block 104.

At block 104, the method 100 collects a trip history associated with the operator of the motor vehicle 10. The trip history includes information regarding past trips taken by the operator. In one example, the trip information includes a starting location, an ending location, and a start time for each trip in the trip history. The trip information can also include an ending time for computing a length of time elapsed since the operator performed each of the trips in the trip history. The trip history can be collected among different motor vehicles 10 in the same household driven by a given operator, with a single account, a vehicle fleet, or a discoverable device through the electronic controller 26 communicating through the cloud 54 (FIG. 1) to access stored data including the trip information for past trips. With the trip information collected, the method 100 proceeds to block 104.

At block 106, the method 100 generates data clusters with each destination in the trip history having its own data cluster. The data clusters are generated by extracting information from the trip history corresponding to a given operator of the motor vehicle 10 and a given destination. One feature of generating a single data cluster for each destination is that each data cluster provides a quantifiable description of past driving behaviors relative to a current location of the operator. Furthermore, for the purposes of generating a single data cluster, the destination may include a single location, such as a single address, or an area within a predetermined distance of a central location. The predetermined distance can include a predetermined number of city blocks or a radius from the single location. One feature of defining a destination in this manner is that it can group a larger destination, such as a shopping center, into a single cluster for prediction purposes.

For each of the destinations identified from the trip information, the data cluster includes multiple input features that correspond to the destination or a relationship between a current location of the operator 40 and the motor vehicle 10 and the destination. In one example, the input features include a distance from a current location of the operator 40 and the motor vehicle 10 to the destination in the data cluster. The input features can also include an elapsed time since the destination was last visited and a number of visits to the destination from the two last matched trip destinations.

The input features can also include an overall number of visits to the destination in a predetermined period of time prior to the new trip being initiated at block 102. In addition to quantifying a number of visits to the destination, the input features can also include a number of visits to the destination from the current location or from a matched weekday type, such as a weekday as compared to a weekend. The input feature can also include a number of visits to the destination based on workday type, such as being a day of the week that the operator works or commutes to work as compared to a day of the week that the operator does not work or commute. The input features can also include a number of visits to the destination on a given part of a day, such as morning, afternoon, evening, or night.

Furthermore, the input features can include combinations of each of the individual input features discussed above. For example, the number of visits for a given destination can be further limited by at least one of matching the part of the day with the current part of the day, matching the current day with the weekday type, matching the current day with the workday type, or determining a number of visits where the current location matches an origin location for the associated destination in a given data cluster. In one example, the current location matches an origin location for a previous trip from the trip history when the current location is within a predetermined distance of the origin location for the previous trip. Once the data clusters for each of the destinations are generated at block 106, the method 100 proceeds to block 108.

At block 108, the data clusters DC, such as DC0-DCX are collected to generate a training dataset 200. FIG. 3 illustrates an example training dataset 200 presented in table form for ease of comprehension. However, the training dataset 200 may take other digital forms when being evaluated by the electronic controller 26. In the illustrated example, the training dataset 200 includes a number of different data clusters DC0-DCX (see leftmost column) and their corresponding input features IF1-IFX as described above represented by a numerical value "#" indicating the strength or frequency of the relationship. In addition to the input features IF in the training dataset 200, the training dataset 200 can be updated after the operator completes the newly initiated trip with a label LAB, such as "1", indicating which destination associated with one of the data clusters DC was visited. Conversely, for each destination that was not visited, the associated row for the column "LAB" is given a "0" label. With the training dataset 200 prepared at block 108, the method 100 proceeds to block 110.

At block 110, the method 100 utilizes a machine learning algorithm in connection with the training dataset 200 to train a machine learning model with information corresponding to the operator of the newly initiated trip. In one example, the machine learning model is a Gradient Boosted Trees Classification Model, such as a Light Gradient Boosting Machine (LGBM). The model is generated from tree-based algorithms that are in a class of supervised machine learning models that construct decision trees. The decision trees constructed can partition the feature predicted space into regions, enabling a hierarchical representation of complex relationships between input variables and outputs. However, this disclosure applies to other types of machine learning models that can be trained with the training dataset 200 generated at block 108.

In addition to training the machine learning model at block 110, the method 100 can also perform hyperparameter tuning (block 112) on the machine learning model to improve the accuracy of the predictions by the model. In one example, the hyperparameter tuning can include applying weights to the input features IF discussed above based on their relative contribution to the destination prediction. In particular, the hyperparameter tuning can utilize at least one of Laplace smoothing to avoid zero possibilities for the predicted destination or exponential decay. With the machine learning model training at block 110, the method 100 proceeds to block 114.

At block 114, the method 100 predicts a destination for the operator of the motor vehicle 10 utilizing the machine learning model training at block 110. In one example, the machine learning model receives as input conditions at least one of the current or origin location of the newly initiated trip, a current time, and an associated day of the week. The machine learning model uses these input conditions to predict at least one destination for the operator 40 of the motor vehicle 10. For example, the machine learning model can be configured to output the two most probable destinations for the operator 40 based on the input conditions.

At block 116, the method 100 can then display the at least one possible destination to the operator 40 on the vehicle navigation system 34. The method 100 can also display a confidence level, such as high, medium, or low, of the at least one possible destination. In one example, the confidence level can be determined based on a level of similarity between the origin location of the operator 40 of the vehicle 10, a time of day, or a day of the week to trips from the trip history. One feature of displaying the predicted destination on a display of the vehicle navigation system 34 is that it provides the operator 40 with the ability to select a desired destination without having to manually enter an address. Once the newly initiated trip from block 102 has been completed at a destination, the trip history from block 104 can be updated to include the new trip information.

The terms "a" and "an" do not denote a limitation of quantity, but rather denote the presence of at least one of the referenced items. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in a suitable manner in the various aspects.

While the above disclosure has been described with reference to exemplary embodiments, it will be understood by those skilled in the art that various changes may be made, and equivalents may be substituted for elements thereof without departing from its scope. In addition, many modifications may be made to adapt a particular situation or material to the teachings of the disclosure without departing from the scope thereof. Therefore, it is intended that the present disclosure not be limited to the particular embodiments disclosed but will include embodiments falling within the scope thereof.

What is claimed is:

1. A method of operating a vehicle, the method comprising:

receiving a trip history for an operator of the vehicle, wherein the trip history includes trip information regarding a plurality of previous trips by the operator of the vehicle;

generating a data cluster corresponding to each destination in the trip history by extracting a plurality of input features from trip information for each trip in the trip history, wherein the plurality of input features characterize a relationship between the operator of the vehicle and the plurality of previous trips and the plurality of input features for each data cluster includes at least one of the input features characterizes a current location for a newly initiated trip with respect to a destination for each of the plurality of previous trips;

generating a training dataset based on collecting the data cluster corresponding to each of the destinations in the trip history;

training a gradient boosted trees model utilizing the training dataset with hyperparameter tuning, wherein the hyperparameter tuning includes applying class weights to each of the plurality of input features based on their respective contribution to destination prediction in the gradient boosted trees model;

predicting a plurality of possible destinations for the operator of the vehicle with the gradient boosted trees model utilizing an origin location of the operator of the vehicle, a time of day, and a day of the week as input conditions for the gradient boosted trees model;

displaying a plurality of possible destinations on a display in the vehicle along with a confidence level that each of the plurality of possible destinations is a desired destination; and providing directions with a navigation system on the vehicle to the desired destination based on a selection by the operator of the vehicle from the plurality of possible destinations on the display.

2. The method of claim 1, wherein the trip history includes at least one of a starting location, an ending location, and a start time for each of the plurality of previous trips.

3. The method of claim 2, wherein the plurality of input features for each data cluster includes a number of visits to each destination corresponding to the data cluster where a current location matches with the origin location and a current day of the week matches a day of the week of a corresponding one of the plurality of previous trips.

4. The method of claim 1, wherein the plurality of input features for each data cluster includes at least one of a distance from the origin location to a corresponding destination for each data cluster and an elapsed time since the operator of the vehicle visited the corresponding destination for each data cluster.

5. The method of claim 4, wherein the plurality of input features for each data cluster includes at least one of a number of visits to each destination corresponding to the data cluster or a number of visits to each destination corresponding to the data cluster with a starting location matching with the origin location.

6. The method of claim 1, wherein the plurality of input features for each data cluster includes a number of visits to each destination corresponding to the data cluster where a current part of day matches part of day of a corresponding one of the plurality of previous trips.

7. The method of claim 6, wherein the plurality of input features for each data cluster includes a number of visits to each destination corresponding to the data cluster where a current day of the week matches at least one of a weekday type for the plurality of previous trips or a workday type for the plurality of previous trips.

8. The method of claim 7, wherein the plurality of input features for each data cluster includes a number of visits to each destination corresponding to the data cluster with a starting location matching with a current location.

9. The method of claim 1, including updating the training dataset with a label indicating if a destination in the trip history was visited at a conclusion of a newly initiated trip.

10. The method of claim 1, wherein the hyperparameter tuning includes applying Laplace smoothing to avoid zero possibilities for the plurality of possible destinations, or exponential decay.

11. The method of claim 10, wherein the hyperparameter tuning includes applying exponential decay.

12. A non-transitory computer-readable storage medium embodying programmed instructions which, when executed by a processor, are operable for performing a method comprising:

receiving a trip history for an operator of a vehicle, wherein the trip history includes trip information regarding a plurality of previous trips by an operator of the vehicle;

generating a data cluster corresponding to each destination in the trip history by extracting a plurality of input features from trip information for each trip in the trip history, wherein the plurality of input features characterize a relationship between the operator of the vehicle and the plurality of previous trips and the plurality of input features for each data cluster includes at least one of the input features characterizes a current location for a newly initiated trip with respect to a destination for each of the plurality of previous trips;

generating a training dataset based on collecting the data cluster corresponding to each of the destinations in the trip history;

training a gradient boosted trees model utilizing the training dataset with hyperparameter tuning, wherein the hyperparameter tuning includes applying class weights to each of the plurality of input features based on their respective contribution to destination prediction in the gradient boosted trees model;

predicting a plurality of possible destinations for the operator of the vehicle with the gradient boosted trees model utilizing an origin location of the operator of the vehicle, a time of day, and a day of the week as input conditions for the gradient boosted trees model;

displaying a plurality of possible destinations on a display in the vehicle along with a confidence level that each of the plurality of possible destinations is a desired destination; and providing directions with a navigation system on the vehicle to the desired destination based on a selection by the operator of the vehicle from the plurality of possible destinations on the display.

13. The computer-readable storage medium of claim 12, wherein the trip history includes at least one of a starting location, an ending location, and a start time for each of the plurality of previous trips.

14. The computer-readable storage medium of claim 13, wherein at least one of the input features characterizes a current location for a newly initiated trip with respect to a destination for each of the plurality of previous trips.

15. The computer-readable storage medium of claim 12, wherein the hyperparameter tuning includes applying Laplace smoothing to avoid zero possibilities for the plurality of possible destinations, or exponential decay.

16. The computer-readable storage medium of claim 12, wherein the plurality of input features for each data cluster includes:

at least one of a distance from the origin location to a corresponding destination for each data cluster and an elapsed time since the operator of the vehicle visited the corresponding destination for each data cluster;

at least one of a number of visits to each destination corresponding to the data cluster or a number of visits to each destination corresponding to the data cluster with a starting location matching with the origin location; and a number of visits to each destination corresponding to the data cluster where a current location matches with the origin location and a current day of the week matches a day of the week of a corresponding one of the plurality of previous trips.

17. A vehicle comprising:

a vehicle body supported by a plurality of road wheels;

a vehicle navigation system configured to provide directions to a destination; and a controller in communication with the navigation system and configured to:

receive a trip history for an operator of the vehicle, wherein the trip history includes trip information regarding a plurality of previous trips by the operator of the vehicle;

generate a data cluster corresponding to each destination in the trip history by extracting a plurality of input features from trip information for each trip in the trip history, wherein the plurality of input features characterize a relationship between the operator of the vehicle and the plurality of previous trips and the plurality of input features for each data cluster includes at least one of the input features characterizes a current location for a newly initiated trip with respect to a destination for each of the plurality of previous trips;

generate a training dataset based on collecting the data cluster corresponding to each of the destinations in the trip history;

train a gradient boosted trees model utilizing the training dataset with hyperparameter tuning, wherein the hyperparameter tuning includes applying class weights to each of the plurality of input features based on their respective contribution to destination prediction in the gradient boosted trees model; and predict a plurality of possible destinations for the operator of the vehicle with the gradient boosted trees model utilizing an origin location of the operator of the vehicle, a time of day, and a day of the week as input conditions for the gradient boosted trees model;

display a plurality of possible destinations on a display in the vehicle along with a confidence level that each of the plurality of possible destinations is a desired destination; and provide directions with a navigation system on the vehicle to the desired destination based on a selection by operator of the vehicle from the plurality of possible destinations on the display.

18. The vehicle of claim 17, wherein the trip history includes at least one of a starting location, an ending location, and a start time for each of the plurality of previous trips.

19. The vehicle of claim 18, wherein at least one of the input features characterizes a current location for a newly initiated trip with respect to a destination for each of the plurality of previous trips.

20. The vehicle of claim 19, wherein the plurality of input features for each data cluster includes:

at least one of a distance from the origin location to a corresponding destination for each data cluster and an elapsed time since the operator of the vehicle visited the corresponding destination for each data cluster;

at least one of a number of visits to each destination corresponding to the data cluster or a number of visits to each destination corresponding to the data cluster with a starting location matching with the origin location; and a number of visits to each destination corresponding to the data cluster where a current location matches with the origin location and a current day of the week matches a day of the week of a corresponding one of the plurality of previous trips.

* * * * *